(No Model.) 3 Sheets—Sheet 1.

J. S. FOLEY.
ORGAN PEDAL.

No. 367,034. Patented July 26, 1887.

Witnesses.
F. B. Fetherstonhaugh
J. M. Jackson

Inventor
James S. Foley
by Donald C. Ridout & Co
Atty (No Model.) 3 Sheets—Sheet 2.

J. S. FOLEY.
ORGAN PEDAL.

No. 367,034. Patented July 26, 1887.

Witnesses.
F. B. Fetherstonhaugh
J. M. Jackson

Inventor:
James S. Foley
by Donald C. Ridout & Co
Atty

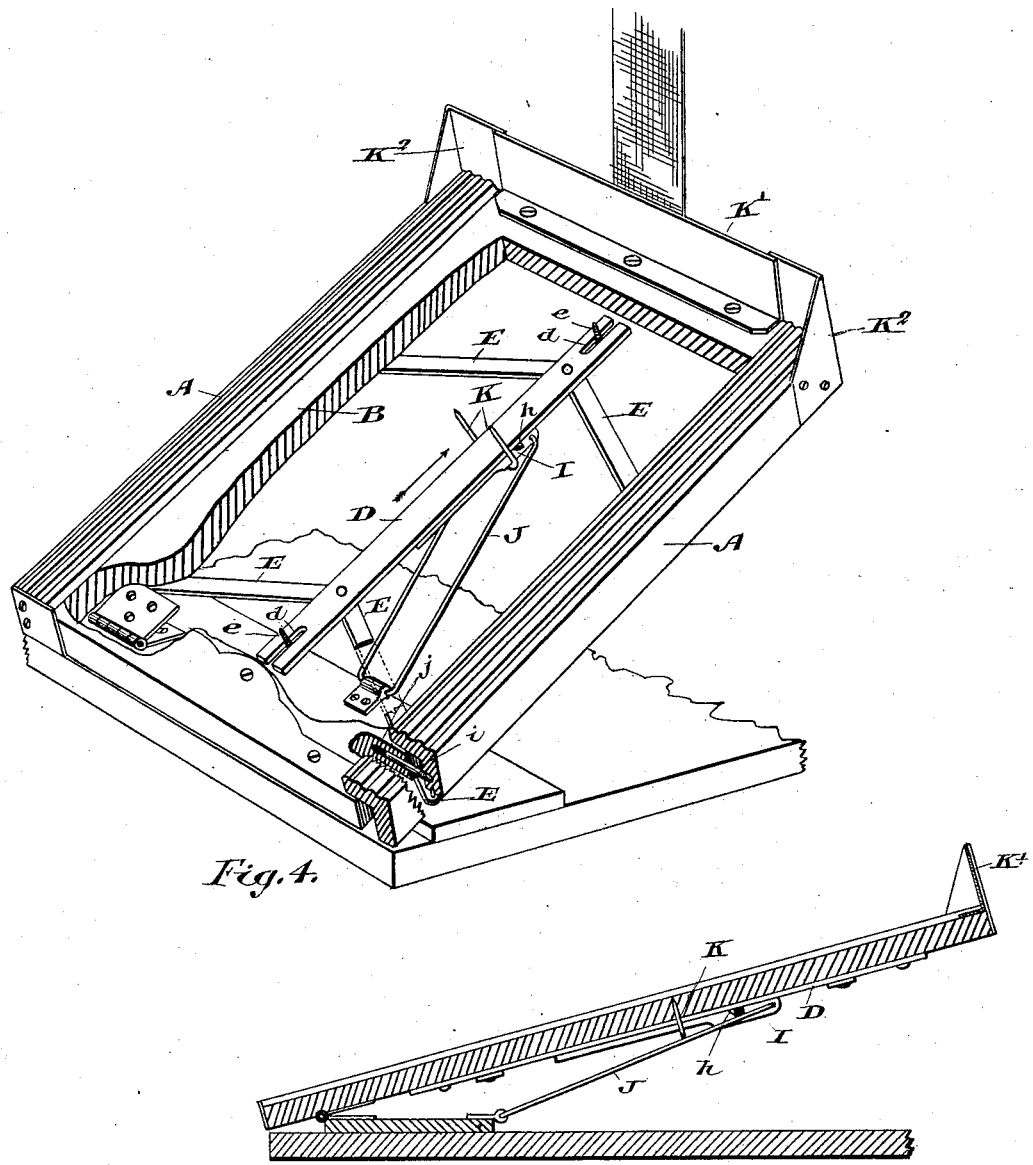

UNITED STATES PATENT OFFICE.

JAMES S. FOLEY, OF CHICAGO, ILLINOIS, ASSIGNOR OF ONE HALF TO JOSEPH RUSE, OF TORONTO, CANADA.

ORGAN-PEDAL.

SPECIFICATION forming part of Letters Patent No. 367,034, dated July 26, 1887.

Application filed May 14, 1887. Serial No. 238,237. (No model.)

*To all whom it may concern:*

Be it known that I, JAMES S. FOLEY, of the city of Chicago, in the county of Cook, in the State of Illinois, one of the United States of America, manufacturer, have invented certain new and useful Improvements in Organ-Pedals, of which the following is a specification.

The object of the invention is to construct the pedals so that when they are not in operation they shall completely close the pedal-box and prevent the admission of dust or of mice, which are so destructive to the bellows and other parts of the instrument; and it consists, essentially, in adjustably connecting the side molding of each pedal and connecting the said moldings to mechanism arranged to press the said moldings against the sides of the pedal-box when the pedals are not in use, and to withdraw the said moldings clear of the sides of the pedal-box the instant that the pedals are put into operation, the whole being otherwise arranged and constructed substantially as hereinafter more particularly explained.

Figures 1, 2:
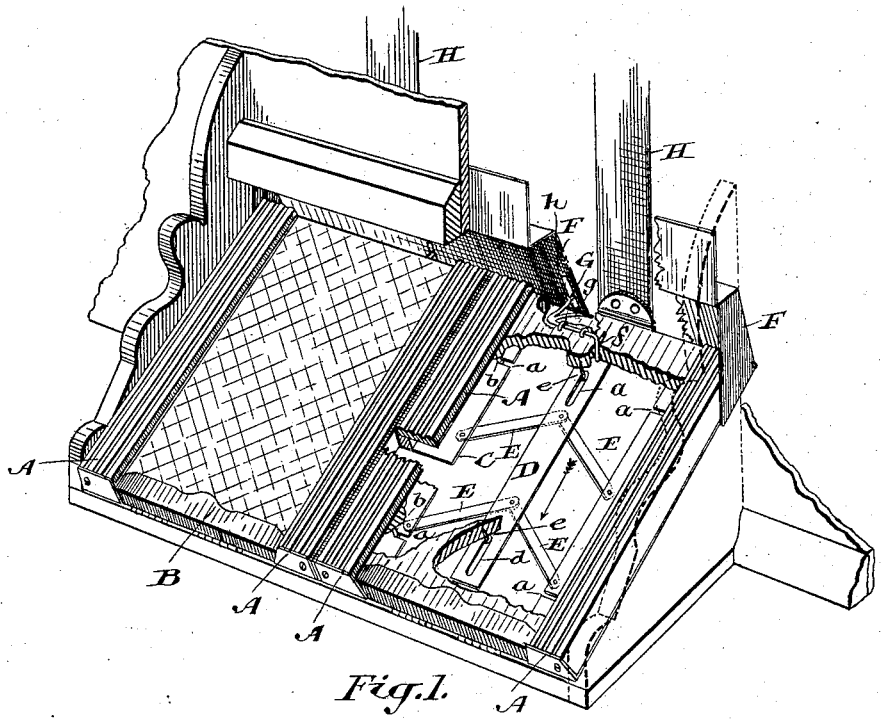
Figure 3:
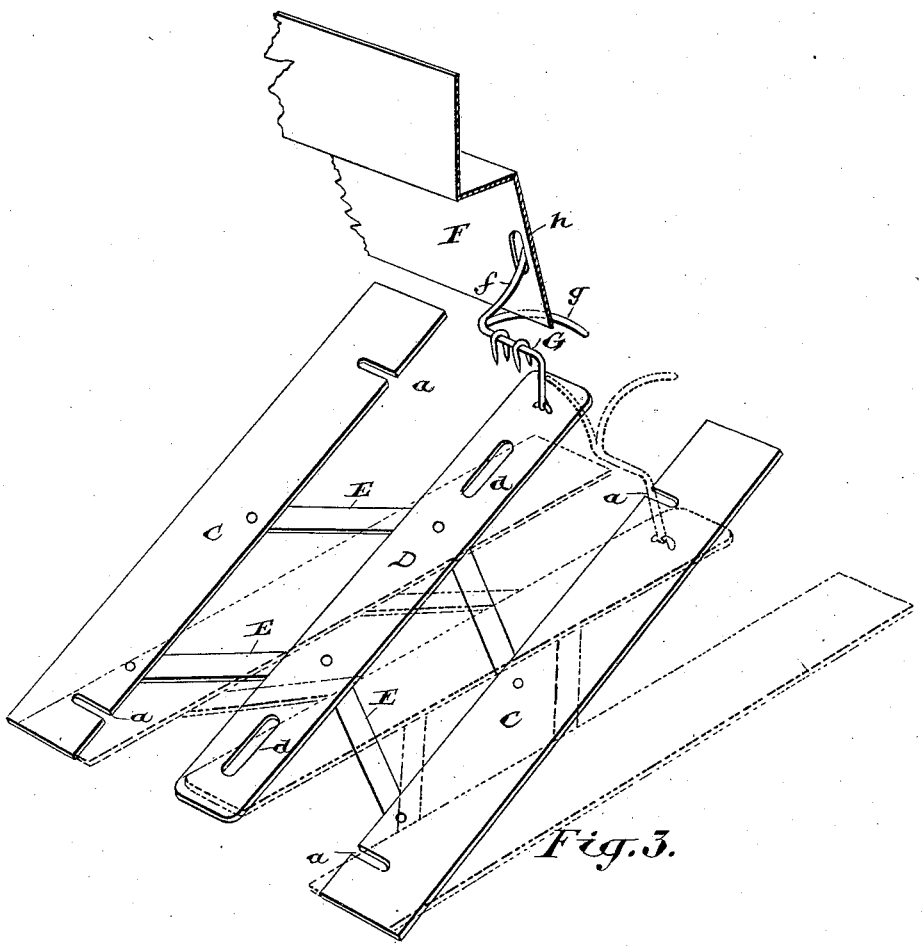

Figure 1 is a perspective view of a pair of pedals, one of which is partially in section to expose the construction of my device. Fig. 2 is a plan of the pedals shown in Fig. 1, and representing the side moldings in the position in which they will appear when the pedals are in operation. Fig. 3 is an enlarged perspective detail of the mechanism by which the side moldings of the pedals are operated. Fig. 4 is an alternative form of mechanism for operating the moldings A. Fig. 5 is a cross section of Fig. 4.

In the drawings like letters of reference indicate corresponding parts in each figure.

A are the side moldings, adjustably fitted upon either side of the pedal B and rigidly fastened to their respective plates C. These plates have slots $a$ made in their inner edges, as shown, for the passage of the screws $b$, which secure the plates C to the pedal B. These slots $a$ permit the plates C to move sidewise.

D is a center plate connected to the side plates, C, by the arms E. Longitudinal slots $d$ are made in the plate D, through which the screws $e$ are passed in order to attach the plate D to the pedal B.

The arms E are set at an angle, as indicated, so that the longitudinal movement of the plate D in the direction indicated by the arrow will push the plates C outwardly, and as they are attached to the side moldings, A, these moldings are likewise moved. A skirting, F, extends across the top of the pedal-box, against which skirting the upper end of the pedal fits when in its normal position.

A double crank, G, is journaled on the pedal B, as indicated. One arm, $f$, of this crank extends through a longitudinal slot made in the pedal B, and is attached to the center plate, D, as indicated. The other arm, $g$, of the crank is bifurcated or forked, as shown.

H is the webbing which connects the pedal B to the bellows, the normal or expanded position of which holds the pedals B up in the position in which they are indicated in Fig. 1, in which position one portion of the bifurcated arm $g$ is behind the skirting F, and extends through the hole $h$, made in the said skirting. When the pedal B is pressed down, the portion of the bifurcated arm mentioned will come in contact with the bottom edge of the holes $h$ and thereby cause the crank G to rock in its journal, and as it is connected to the plate D, as shown, the said plate will be caused to move in the opposite direction to that in which the arrow points, thereby drawing the plates C closer to it; and as these plates are connected to the moldings A, as mentioned, the said moldings are withdrawn from the sides of the pedal-box, so that the pedals may be worked freely without touching the sides of the pedal-box. When the foot is removed from the pedal, the webbing H naturally pulls it back into its normal position, and the bifurcated arm $g$ of the crank G, by coming in contact with the bottom edge of the skirting F, will cause the crank G to rock in its bearing in the opposite direction, thereby causing the plate D to move in the direction indicated by the arrow, and, owing to the connection before described, causes the moldings A to be expanded outwardly toward the sides of the pedal-box, against which they are held, thereby effectually closing the pedal-box so long as the pedals remain in their normal position.

It will of course be understood that the side moldings, A, need not necessarily be moldings, and that instead of being detachable from the plates C they may be made a portion of the said plates.

In Fig. 4 I show an alternative form of mechanism for operating the moldings A. In this form I pivot the arms E direct to the moldings A, and adjustably connect these moldings to the pedal B by means of the pins $i$, which are screwed into the moldings and project into holes made in the sides of the pedal. On the bottom of the plate D, I connect, by means of the staple K and saddle I, a link, J, the other end of which is pivoted or journaled on the frame of the instrument immediately below the pedal, as shown in Fig. 4. Consequently, when the pedal is pressed down, the plate D will be pushed in the direction indicated by arrow by the link J, and as the said plate is connected by the arms E to the moldings A the said moldings will be drawn toward the sides of the pedal, thereby carrying them clear of the sides of the pedal-box, so that the pedal may be worked freely.

Instead of the skirting F, I connect a plate, K', to the pedal, which effectually closes the pedal-box at the toe of the pedal when the latter is in its normal position. The plate K' is connected to the body of the pedal, while the corner plates, K'', are connected to the moldings A. In order that the moldings A may remain stationary while the pedal is being operated, I form the saddle I with a notch in its face to receive the lip formed on the bottom side of the plate D. When the pedal is in its normal position, as indicated in Fig. 4, the staple K holds the saddle against the lip, so that a connection is formed between the saddle and the said plate. When the pedal is pressed down, the thick portion of the saddle I is moved from the staple, as indicated in Fig. 5, thereby loosening the connection between the plate D and saddle I, so that the motion of the pedal shall not affect the side moldings, A.

What I claim as my invention is—

1. The moldings A, adjustably connected to the pedal B, in combination with mechanism designed to press the said moldings A outwardly against the side of the pedal-box when the pedals are in their normal position, substantially as and for the purpose specified.

2. The side plates, C, rigidly secured to the side moldings, A, and laterally adjustably connected to the pedal B, the center plate, D, longitudinally adjustably connected to the pedal B and by the arms E to the plates C, in combination with mechanism designed to press the moldings A outwardly against the side of the pedal-box when the pedals are in their normal position, substantially as and for the purpose specified.

3. The side plates, C, rigidly secured to the side moldings, A, and laterally adjustably connected to the pedal B, the center plate, D, longitudinally adjustably connected to the pedal B and by the arms E to the plates C, in combination with the double crank G, journaled in the pedal B and connected by one of its arms to the plate D, and having its other arm bifurcated and designed to come in contact with the skirting F, substantially as and for the purpose specified.

Toronto, April 16, 1887.

JAMES S. FOLEY.

In presence of—
 CHARLES C. BALDWIN,
 CHAS. H. RICHES.